3,097,998
HALOACRYLATE PESTICIDES
Lee A. Miller, Kirkwood, Mo., assignor to Monsanto Chemical Company, St. Louis, Mo., a corporation of Delaware
No Drawing. Original application Dec. 21, 1959, Ser. No. 860,662, now Patent No. 3,040,086, dated June 19, 1962. Divided and this application Dec. 6, 1961, Ser. No. 157,585
9 Claims. (Cl. 167—22)

This invention relates to derivatives of olefinic acids and more particularly provides as new compounds a valuable class of thioether halo olefinic carboxylates, the method of preparing the same and biological toxicants comprising the new compounds.

According to the invention there are provided compounds of the formula

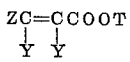

in which Z is selected from the class consisting of hydrogen and hydrocarbon radicals which are free of aliphatic unsaturation and contain from 1 to 12 carbon atoms, T is an alkyl radical of from 1 to 5 carbon atoms and Y is selected from the class consisting of halogen, alkyl-S—, aryl-S—, and alkylaryl-S— radicals of from 1 to 12 carbon atoms and halogen substitution products of such radicals, and in which one Y, and only one Y, is halogen.

It will be noted that the compounds of the above formula includes isomeric thioether halo carboxylates, i.e., compounds of the formula (I)
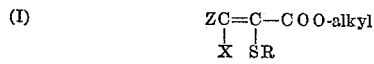

or (II)
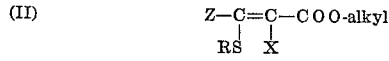

where Z is as above defined, X is halogen and R is selected from the class consisting of alkyl, aryl and alkylaryl radicals of from 1 to 12 carbon atoms and halogen substitution products thereof. Compounds of both the Formula I and the Formula II are prepared, according to the invention, by the addition reaction of a sulfenyl halide of the formula RSX and an acetylenic carboxylate. The addition occurs across the acetylenic bond by the following schemes:

(A)    RSX+ZC≡CCOOT ⟶ 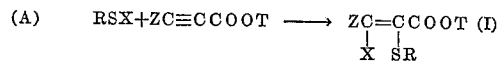 (I)

(B)    RSX+ZC≡CCOOT ⟶ 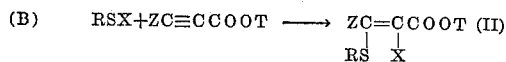 (II)

Generally, reaction by both schemes occurs simultaneously; however, there is a preferential tendency to scheme (A). The reaction product thus usually consists of a predominant quantity of (I) and a minor quantity of (II). This mixture of isomers can be resolved, if desired, by isolating procedures known to those skilled in the art, e.g., by fractional distillation or crystallization, solvent extraction, etc.

A particularly valuable class of compounds provided by the invention are the addition products of a sulfenyl halide and an alkyl propiolate. Such products have the general formula

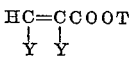

in which T and Y are as above defined. When the sulfenyl halide is an alkanesulfenyl halide, the products are alkyl 2-alkylthio-3-haloacrylates and alkyl 3-alkylthio-2-haloacrylates, i.e., compounds having the respective formulas

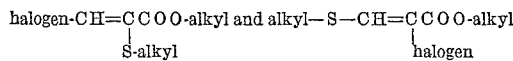

When the sulfenyl halide is an aromatic hydrocarbon sulfenyl halide, the products from the alkyl propiolate are the alkyl 2-arylthio-3-haloacrylates and the 3-arylthio-2-haloacrylates. The nature of the thioether group thus depends upon the individual sulfenyl halide which is used. As herein disclosed, either the alkyl or the aryl portions of the sulfenyl halide may be halogenated.

Examples of the presently provided aromatic thioether haloacrylates prepared according to the invention from an aromatic sulfenyl halide and an alkyl propiolate are methyl, isopropyl or amyl 2-(2-chlorophenylthio)-3-chloroacrylate or 3 - (2 - chlorophenylthio)-2-chloroacrylate which are prepared from 2-chlorobenzenesulfenyl chloride and either methyl, isopropyl or amyl propiolate; the ethyl or tert-amyl or n-butyl 2-(3- or 4-tolylthio)-3-chloroacrylate or 3-(3- or 4-tolylthio)-2-chloroacrylate which are obtained from 3- or 4-toluene sulfenyl chloride and ethyl, tert amyl or n-butyl propiolate; the methyl, n-propyl or n-butyl 2-phenylthio-3-chloroacrylate or 3-phenylthio-2-chloroacrylate which is prepared from methyl, n-propyl or butyl propiolate and benzenesulfenyl chloride; the isoamyl or methyl or propyl 2-(2-, 3- or 4-chlorophenylthio)-3-bromoacrylate or 3-(2-, 3- or 4-chlorophenylthio)-2-bromoacrylate which is obtainable from isoamyl, methyl or propyl propiolate and 2-, 3- or 4-chlorobenzenesulfenyl bromide; the ethyl, n-amyl or methyl 2-(2,3- or 3,4-dichlorophenylthio)-3-fluoroacrylate or 3-(2,3- or 3,4-dichlorophenylthio)-2-fluoroacrylate which is obtained from ethyl, n-amyl or methyl propiolate and 2,3- or 3,4-dichlorobenzenesulfenyl fluoride; the methyl, ethyl, or isopropyl 2-(3,4,5- or 2,4,6-trichlorophenylthio)-3-chloroacrylate or 3-(3,4,5- or 2,4,6-trichlorophenylthio)-2-chloroacrylate which is obtained from methyl, ethyl or isopropyl propiolate and 3,4,5- or 2,4,6-trichlorobenzenesulfenyl chloride; the ethyl, isopropyl or tert-butyl 2-(2,3,4,5- or 2,3,4,6-tetrachlorophenylthio)-3-bromoacrylate or 3-(2,3,4,5- or 2,3,4,6-tetrachlorophenylthio)-2-bromoacrylate which is prepared from ethyl, isopropyl or tert-butyl propiolate and 2,3,4,5- or 2,3,4,6-tetrachlorobenzenesulfenyl bromide; the methyl, tert-amyl or isobutyl 2-(pentachlorophenylthio)-3-chloroacrylate or 3-(pentachlorophenylthio)-2-chloroacrylate which is obtained from methyl, tert-amyl or isobutyl propiolate and pentachlorobenzenesulfenyl chloride; the methyl, ethyl or propyl 2-(α- or β-naphthylthio)-3-chloroacrylate or 3-(α- or β-naphthylthio)-2-chloroacrylate which is obtained from methyl, ethyl or propyl propiolate and α- or β-naphthalenesulfenyl chloride; the amyl, ethyl or butyl 2-(4-biphenylylthio)-3-chloroacrylate or 3-(4-biphenylylthio)-2-chloroacrylate which is obtained from amyl, ethyl or butyl propiolate and 4-biphenylsulfenyl chloride; the methyl, isopropyl or amyl 2-(4-butylphenylthio)-3-bromoacrylate or 3-(4-butylphenylthio)-2-bromoacrylate which is obtained from methyl, isopropyl or amyl propiolate and 4-butylbenzenesulfenyl bromide; the butyl, propyl or methyl 2-(3-hexylphenylthio)-3-chloroacrylate or 3-(3-hexylphenylthio)-2-chloroacrylate from butyl, propyl or methyl propiolate and 3-hexylbenzenesulfenyl chloride, etc.

Examples of aliphatic thioether haloacrylates are methyl, ethyl or n-butyl 2-methylthio-3-chloroacrylate or 3-methylthio-2-chloroacrylate which is prepared from methanesulfenyl chloride and either methyl, ethyl or n-butyl propiolate; the ethyl, isoamyl or butyl 2-chloromethylthio 3-bromoacrylate or 3-chloromethylthio-2-bromoacrylate which is prepared from chloromethanesulfenyl bromide and ethyl, isoamyl or butyl propiolate; the methyl, n-propyl or isoamyl 2-ethylthio-3-chloroacrylate or 3-ethylthio-2-chloroacrylate which is prepared from methyl, n-propyl or isoamyl propiolate and ethanesulfenyl chloride; the isoamyl or methyl or ethyl 2-butylthio-3-bromoacrylate or 3-butylthio-2-bromoacrylate which is obtainable from isoamyl, methyl or ethyl propiolate and butanesulfenyl bromide; the ethyl or amyl or propyl 2-(2,2-dichloroethylthio)-3-chloroacrylate or 3-(2,2-dichloroethylthio)-2-chloroacrylate which is obtained from ethyl, amyl or propyl propiolate and 2,2-dichloroethanesulfenyl chloride; the methyl, ethyl or isopropyl 2-(tetrachlorooctylthio)-3-bromoacrylate or 3-(tetrachlorooctylthio)-2-bromoacrylate which is obtained from methyl, ethyl or isopropyl propiolate and tetrachlorooctanesulfenyl bromide; the methyl, n-butyl or ethyl 2-hexylthio-3-chloroacrylate or 3-hexylthio-2-chloroacrylate which is obtained from methyl, n-butyl or ethyl propiolate and hexanesulfenyl chloride; the methyl, isopropyl or amyl 2-(2-fluoroethylthio)-3-chloroacrylate or 3-(2-fluoroethylthio)-2-chloroacrylate which is obtained from methyl, isopropyl or amyl 2-fluoroethanesulfenyl chloride and methyl, isopropyl or amyl propiolate; the isopropyl, methyl or n-amyl 2-decylthio-3-bromoacrylate or 3-decylthio-2-bromoacrylate which is obtained from decanesulfenyl chloride and isopropyl, methyl or n-amyl propiolate; the methyl, n-propyl or butyl 2-(3-iodopropylthio)-3-chloroacrylate or 3-(3-iodopropylthio)-2-chloroacrylate which is prepared from methyl, n-propyl or butyl propiolate and 3-iodopropanesulfenyl chloride; the methyl, ethyl or butyl 2-(3,4-dibromobutylthio)-3-bromoacrylate or 3-(3,4-dibromobutylthio)-2-bromo acrylate which is obtainable from the methyl, ethyl or butyl propiolate and 3,4-dibromobutanesulfenyl chloride, etc.

The cycloalkane sulfenylhalides add in the same manner to the alkyl propiolates; for example, methyl, ethyl or isopropyl 2-cyclohexylthio-3-chloroacrylate or 3-cyclohexylthio-2-chloroacrylate is obtained from methyl, ethyl or isopropyl propiolate and cyclohexanesulfenyl chloride; and methyl, propyl or butyl 2-(3-chloropentylthio)-3-bromoacrylate or 3-(3-chloropentylthio)-2-bromoacrylate is obtained from methyl, propyl or butyl propiolate and 3-chloropentanesulfenyl bromide.

As hereinbefore disclosed, the presently useful acetylenic reactants have the formula ZC≡CCOOT where Z is selected from the class consisting of hydrogen and hydrocarbon radicals which are free of aliphatic unsaturation and contain from 1 to 12 carbon atoms. The alkyl propiolates and the products therefrom have been particularly referred to because of the 2-acetylenic acids, propiolic acid is the most common. Other acetylenic acid esters of the above formula and useful for the present purpose are, for example, the methyl, ethyl, propyl, isopropyl, butyl, tert-butyl, isobutyl, amyl, isoamyl or tert-amyl tetrolates, 2-pentynoates, 4-ethyl-2-pentynoates, 2-hexynoates, phenylpropiolates, 3-(2-, 3- or 4-tolyl) propiolates, 2-heptynoates, 6-methyl-2-heptynoates, 3-cyclohexyl-2-propiolate, 2-methylcyclopentyl-2-heptynoates, 2-octynoates, 2-, 3- or 4-ethylphenylpropiolates, 1- or 2-naphthylpropiolate, 2-decynoates, 2-dodecynoates, 2-tetradecynoates, 3-(4-biphenylyl)propiolates, 3-(2-hexylphenyl)propiolates, etc.

Examples of sulfenyl halides which are reacted with the propiolates or the other acetylenic carboxylates of the formula ZC≡CCOOT are the alkanesulfenyl halides such as methane-, ethane-, propane-, butane-, pentane-, 2-methylpropane-, hexane-, heptane-, 2-ethylhexane-, octane-, nonane-, decane-, 2,7-dimethylnonane-, dodecane- and 2-butyl-octanesulfenyl chloride, bromide, iodine or fluoride; the halogenated alkanesulfenyl halides such as chloromethane-, dichloromethane-, trichloromethane-, 1,2-dichloroethane-, 3,3,3-trichloropropane-, 3-fluoropropane-, 2-iodoethane-, 4-chlorobutane, tetrachloropentane-, 2-bromoethane,- dichlorohexane-, trichlorooctane-, chlorononane-, dibromodecane-, bromododecane-, and dichlorododecanesulfenyl chloride, bromide, iodide or fluoride.

Examples of aromatic sulfenyl halides which are useful for reaction with the acetylenic carboxylates are benzene-, 1- or 2-naphthalene-, 2-, 3- or 4-biphenyl-, 2-, 3- or 4 - toluene-, 2-, 3-, or 4 - isopropylbenzene-, 2,3,5, or 2,3,4-trimethylbenzene-, 2-, 3-, or 4-hexylbenzene-, 2-methyl-1-naphthalene-, 2-,phenylethane, phenylmethane-, chlorobenzene-, 2,3-, 3,4-, or 2,4-dichlorobenzene-, 2,3,5-, 2,3,4-, or 3,4,5-trichlorobenzene-, bromobenzene-, (trifluoromethyl)-benzene-; 2-chloro-4-ethylbenzene-, 3-iodo-4-hexylbenzene-, 1 - bromo - 2 - naphthalene-, 4-chlorobiphenyl-, or pentachlorobenzenesulfenyl chloride, bromide, iodide or fluoride.

The cycloaliphatic sulfenyl halides which react with the acetylenic carboxylates according to the present invention are for example, cyclohexane-, 2- or 3-methylcyclopentane-, 2-, 3-, or 4-chlorocyclohexane-, 2-, 3-, or 4-bromocyclohexane-, tetrachlorocyclopentanesulfenylchloride, bromide or iodide.

Examples of thioether haloalkenoates other than the thio ether haloacrylates which are provided by the invention are shown below:

Ethyl 2-phenylthio-3-chloro-2-butenoate
Methyl 2-chloromethylthio-3-bromo-2-hexenoate
Ethyl 2-ethylthio-3-phenyl-3-chloroacrylate
Butyl 2-(4-chlorophenylthio)-3-phenyl-3-chloroacrylate
Methyl 2-methylthio-3-bromo-2-pentenoate
Amyl 2-(1-naphthylthio)-3-phenyl-3-chloroacrylate
Methyl 2-(4-biphenylylthio)-3-chloro-2-pentenoate
Ethyl 2-(pentachlorophenylthio)-3-bromo-2-octenoate
Ethyl 2-(2-bromoethylthio)-3-phenyl-3-chloroacrylate
Methyl 2-cyclohexylthio-3-iodo-2-butenoate
Propyl 3-dodecylthio-2-chloro-3-phenylacrylate
Isobutyl 3-hexylthio-2-fluoro-3-phenylacrylate
Methyl 3-methylthio-2-iodo-2-dodecenoate
Ethyl 3-(3,3,3-trichloropropylthio)-2-iodo-3-cyclopentylacrylate Reaction of the acetylenic carboxylate with the sulfenyl halide to give the present thioether halo olefinic esters takes place readily by mixing the carboxylate with the sulfenyl halide, advantageously in the presence or absence of an inert diluent and in the presence or absence of a catalyst, and allowing the resulting mixture to stand at ordinary or increased temperature until formation of the acrylate has occurred. Heating at say, a temperature of up to the refluxing temperature of the reaction mixture is employed. The ester product is readily recovered from the resulting mixture by removing the diluent, if any, and any unreacted material, e.g., by distillation or solvent extraction. As diluents there may be employed, e.g., ether, chloroform, dioxane, hexane, petroleum spirits, etc. When catalysts are employed, the more useful ones are acidic agents, e.g., glacial acetic, 4-toluenesulfonic acid, cuprous chloride, pyrophosphoric acid, etc. The catalyst is employed in only very small quantities, say, in a quantity of from .001 percent to .01 percent based on the weight of the acetylenic carboxylate. Generally, the quantity of catalyst which is used is so small that no precautions need be taken to separate it from the product. Acetic acid serves as solvent and catalyst.

Since formation of the present esters involves addition of one mole of the sulfenyl halide to one mole of the acetylenic carboxylate, these reactants are advantageously employed in such stoichiometric proportions. However, since an excess of either the carboxylate or the sulfenyl halide is easily separated from the reaction product such quantities need not be used.

The presently provided esters are stable, well-defined materials which vary from viscous liquids to crystalline solids. They are advantageously employed for a variety of industrial and agricultural purposes, e.g., as copolymerizing monomers in the preparation of synthetic resins and plastics, as rubber adjuvants, as lubricant additives, and as biological toxicants against weeds, insects, bacteria and fungi. For these and various other applications, generally the crude mixture of isomeric thioether halo olefinic carboxylates can be used, i.e., there is no need to separate the 2-thioether 3-halo isomer from the 3-thioether 2-halo isomer prior to utilization. However, as pointed out above, for specialty uses, e.g., for use as a starting material in the synthesis of pharmaceuticals and sometimes for use as copolymerizing monomers, it is advantageous to work with only, say, the substantially pure 2-thioether 3-halo compounds.

The invention is further illustrated but not limited by the following examples.

Example 1

A mixture consisting of 28.8 g. (0.2 mole) of benzenesulfenyl chloride, 16.8 g. (0.2 mole) of methyl propiolate and 100 ml. of acetic acid was heated at reflux for fifteen minutes. Removal of solvent by evaporation and subsequent distillation of the residue gave the substantially pure methyl 2-phenylthio-3-chloroacrylate, B.P. 109° C.–110° C./0.3 mm. Redistillation gave a pure fraction, B.P. 110–111° C./0.6 mm., $n_D^{25}$ 1.5820 which analyzed 52.77% carbon and 4.00% hydrogen as against 52.52% and 3.97% the respective calculated values for carbon and hydrogen.

Example 2

A mixture consisting of 79.3 g. (0.5 mole) of 4-toluenesulfenyl chloride, 42 g. (0.5 mole) of methyl propiolate and 150 ml. of glacial acetic acid was heated at reflux for fifteen minutes. Evaporation of the solvent and distillation of the residue gave the following fractions:

I. 8.5 g., B.P. 107–125° C./0.6–0.5 mm., $n_D^{25}$ 1.5795
II. 46.5 g., B.P. 126–125–127° C./0.5–0.4 mm., $n_D^{25}$ 1.5745
III. 31.5 g., B.P. 128–146° C./0.4–0.5 mm., $n_D^{25}$ 1.5869
IV. 12.0 g., B.P. 147–151° C./0.4 mm., $n_D^{25}$ 1.6105

Fraction II is substantially pure methyl 2-(4-tolylthio)-3-chloroacrylate, analyzing 54.31% carbon and 4.68% hydrogen as against 54.43% carbon and 4.57% hydrogen the calculated values. The other fractions are mixtures of this compound and the isomeric 3-(4-tolylthio)-2-chloroacrylate. Thus, fraction III analyzes 55.39% carbon and 4.77% hydrogen and infrared analyses showed fraction II to possess the following structures:

Aromatic CH at 3050 cm.$^{-1}$
Aliphatic CH at 2900 cm.$^{-1}$
Phenyl—CH=CH— at 1580 cm. and 1480 cm.$^{-1}$
—OCH$_3$ at 1435 cm.$^{-1}$
Two adjacent protons at 808 cm.$^{-1}$
There was no evidence of a triple bond.

Infrared analysis of a redistilled fraction IV (cuts with B.P. 159–161°/0.5 mm. and B.P. 178–176° C./0.3 mm. showed similar spectra) showed the following structures:

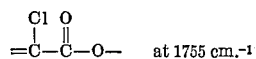 at 1755 cm.$^{-1}$

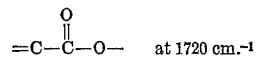 at 1720 cm.$^{-1}$

Aromatic CH at 3000 cm.$^{-1}$
Aliphatic CH at 2950 cm.$^{-1}$
Phenyl—CH=CH at 1590 cm.$^{-1}$ and 1480 cm.$^{-1}$
—OCH$_3$ at 1435 cm.$^{-1}$
—CH$_3$ at 1395 cm.$^{-1}$
Ester C—O at 1300, 1260 and 1220 cm.$^{-1}$
Two adjacent protons at 808 cm.$^{-1}$ The presence of the first two structures shows the presence of both isomers, i.e., addition of the 4-toluenesulfenyl chloride to the methyl propiolate proceeded with formation of both of the following structures:

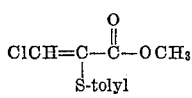

and

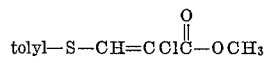

Example 3

Methanesulfenyl chloride was prepared by bubbling chlorine into 200 ml. of carbon tetrachloride until 18 g. (0.25 mole) of the chlorine had been absorbed, adding to the resulting reaction mixture 23.4 (0.25 mole) of dimethyl disulfide dissolved in 50 ml. of carbon tetrachloride while maintaining the temperature of the reaction mixture at 0° C.±5° C., and finally stirring the whole at 0° C. for 30 minutes. To the resulting solution of the methanesulfenyl chloride there was then added 21 g. (0.25 mole) of methyl propiolate and the whole was allowed to stand at room temperature overnight. Evaporation of the solvent under water pump pressure and distillation of the residue gave the substantially pure methyl 2-methylthio-3-chloroacrylate, B.P. 94–95° C./ 1 mm., $n_D^{25}$ 1.5201 analyzing 35.91% carbon and 4.50% hydrogen as against 35.1% and 4.22% the respective carbon and hydrogen values.

Example 4

A mixture consisting of 15.3 g. (0.05 mole) of pentachlorobenzenesulfenyl chloride, 8.4 g. (0.1 mole) of methyl propiolate and 100 ml. of acetic acid was heated at reflux for 2 hours. Removal of solvent and unreacted methyl propiolate gave as residue a crystalline mixture of the isomeric methyl (pentachlorophenylthio)chloroacrylates, i.e., methyl 2-(pentachlorophenylthio)-3-chloroacrylate and methyl 3-(pentachlorophenylthio)-2-chloroacrylate. Infrared analysis of the product, after twice repeated crystallization from benzene showed the presence of the following structures:

CH at 3020 cm.$^{-1}$
—C=O at 1700 cm.$^{-1}$
—C=C at 1600, 1560 and 1500 cm.$^{-1}$
Cl$_5$C$_6$S— at 1325 and 1300 cm.$^{-1}$
—C—O-ester at 1220 cm.$^{-1}$
=CCl at 685 cm.$^{-1}$

Example 5

A mixture consisting of 4.20 g. (0.05 mole) of methyl propiolate and 25 ml. of glacial acetic acid was added to a mixture consisting of 4-chlorobenzenesulfenyl chloride in 50 ml. of glacial acetic acid. The resulting red solution was refluxed for 10 minutes before the color abruptly turned yellow (indicates termination of reaction). After refluxing for an additional 50 minutes, the solvent was evaporated and the residue was distilled to give a mixture of the isomeric methyl (4-chlorophenylthio)chloroacrylates, B.P. 106–107 C./0.01 mm. and analyzing as follows:

|  | Found | Calcd. for C$_{10}$H$_8$Cl$_2$SO$_2$ |
|---|---|---|
| Percent C | 45.63 | 45.64 |
| Percent H | 3.14 | 3.07 |
| Percent S | 12.11 | 12.18 |

Example 6

This example shows insecticidal evaluation of the methyl 2-phenylthio-3-chloroacrylate of Example 2 and of the methyl (4-chlorophenylthio)chloroacrylate of Example 5.

Culture tubes (rimless, 25 x 200 mm.) were respectively filled with 70 cc. of distilled water. Acetone solutions (1.0%) of the compounds were then respectively pipetted into the culture tubes in a quantity calculated to give an 0.001% concentration of either the compound of Example 2 or the compound of Example 5 in each of said tubes. Each tube was rubber-stoppered and shaken vigorously to facilitate complete mixing. To each tube of the resulting test solutions there was then added 25 yellow fever mosquito (Aëdes aegypti (Linné) larvae, and the test solutions with their larvae content were allowed to stand for 24 hours at room temperature. Observation of the tubes of larvae at the end of that time showed 100% kill of larvae in the tubes containing either the compound of Example 2 or that of Example 5.

*Example 7*

This example shows testing of the methyl(pentachlorophenylthio)chloroacrylate of Example 4, of the methyl 2-(4-tolythio)-3-chloroacrylate of Example 1 and of the methyl 2-methylthio-3-chloroacrylate of Example 3, as soil fungicides. In this test method, naturally-infested soil fortified with fungi that incite root rots, stem cankers, seedling blights, and seed decay is treated with a test chemical and incubated in a sealed container for a period of 24 hours. Seeds are sowed in the treated soil which is then incubated at 70° F. for 48 hours before being removed to greenhouse benches. Disease assessments are made two weeks later.

A uniform supply of infested soil containing the following organisms was prepared:

Rhizoctonia solani
Fusarium oxysporum f. vasinfectum
Sclerotium rolfsii
Verticillium albo-atrum
Pythium ultimum A 6 ml. aliquot of a 1% stock solution of the test chemical was pipetted into respective jars containing 600 g. of infested soil. This initial application rate was 100 p.p.m. or approximately 200 pounds per 6" acre. The jars were sealed and the contents thoroughly mixed by vigorous shaking. The treated soils were incubated at 70° C. and 24 hours later were transferred to 4" pots. Fifteen cotton and cucumber seeds were sowed in each pot. The seeded pots were then incubated at 70° F. and at a high relative humidity (96-98%) to assure activity of the organism in the soil. Forty-eight hours later the pots were removed to the greenhouse.

Two weeks later the number of seedlings emerged and the number remaining healthy were recorded. The percent emergence and disease incident was based on the inoculated, untreated and the sterile soil treatments. The following rating scale was used.

| Rating: | Number of healthy plants |
|---|---|
| E=Excellent | 26–30 |
| P=Promising | 19–25 |
| F=Fair | 11–18 |
| N=No good | 10 or less |

With the methyl (pentachlorophenylthio)acrylate or the 2-(4-tolythio)-3-chloroacrylate an excellent rating was thus obtained. A promising rating was obtained for the 2-methylthio-3-chloroacrylate. Repetition of the testing at a 30 p.p.m., instead of a 100 p.p.m., concentration also gave promising to excellent results.

*Example 8*

The methyl (4-chlorophenylthio)chloroacrylate of Example 5 was evaluated as a preemergent herbicide as follows:

Two pans of test plants were prepared by filling two aluminum pans (9" x 13" x 2" in dimension and perforated at the bottom with twelve ¼" holes with a sand-soil mixture consisting of two parts of a good grade top soil which had been screened to ¼" mesh and ¼ part sand. The mixture was compacted to within ⅜" of the pan top and over the compacted soil there were scattered at random 20 seeds each of the following: buckwheat, radish, sugar beet, crab grass, and pigweed. The resulting seeded surface was covered with the sand-soil mixture to the pan top, i.e., to a depth of ⅜". The thus planted pans were then sprayed with 30 cc. of an aqueous solution containing 1% by weight of a liquid fertilizer and 0.1% by weight of octamethyl pyrophosphoramide (insecticide). One of the planted pans was sprayed with 30 cc. of an aqueous emulsion containing 0.2% of the methyl (4-chlorophenylthio)chloroacrylate and the other pan was left unsprayed so that it would serve as a "blank." The two pans were then placed in ½" of water to absorb moisture through the perforated bottom until the soil surface was completely moist. They were then transferred to a wet sand bench in the greenhouse and maintained in the greenhouse under standard conditions of sunlight and watering for ten days. Observation of the pans at the end of that time showed no germination of seeds in the pan which had been sprayed with the emulsion of the methyl (4-chlorophenylthio)chloroacrylate whereas in the pan which had been left unsprayed the seeds had germinated into flourishing plants.

The present carboxylates may be applied as fungicides, insecticides or herbicides by any suitable method, for example, as sprays or as dusts comprising an inert carrier which may be a liquid or powdered solid. When used as sprays they may be employed in solution or in emulsion form. I have found that oil-in-water emulsions of the carboxylates possess an improved tendency to adhere to the treated organism and that less of the active ingredient, i.e., the thioether halo olefinic carboxylate is required to give comparable fungicidal, insecticidal, or herbicidal effect. The emulsions are readily prepared by first preparing a solution of the carboxylate in an organic solvent and then adding the resulting solution to water containing an emulsifying agent to form an emulsion. Emulsifying agents which may be employed are those customarily used in the art for the preparation of oil-in-water emulsions. The word "oil" is here used to designate any organic liquid which is insoluble in water. Examples of emulsifying agents which may be used include alkyl benzene sulfonates, long chained polyalkylene glycols; long chained alkyl sulfosuccinates, etc.

This is a division of my copending application, Serial No. 860,662, filed December 21, 1959, now U.S. Patent No. 3,040,086.

What is claimed is:

1. The method of combatting insects and their larvae which comprises applying to their habitat an insecticide comprising as the essential ingredient a carboxylate of the general formula

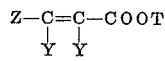

in which Z is selected from the class consisting of hydrogen and hydrocarbon radicals which are free of aliphatic unsaturation and contain from 1 to 12 carbon atoms, T is an alkyl radical of from 1 to 5 carbon atoms and Y is selected from the class consisting of halogen, alkyl-S—, aryl-S—, and alkylaryl-S— radicals of from 1 to 12 carbon atoms and halogen substitution products of such radicals, and in which one Y, and only one Y, is halogen.

2. The method of claim 1 wherein the essential carboxylate has the formula

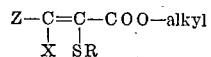

wherein Z is selected from the class consisting of hydrogen and hydrocarbon atoms which are free of aliphatic unsaturation and contain from 1 to 12 carbon atoms, X is halogen, R is selected from the class consisting of alkyl, aryl and alkaryl radicals of from 1 to 12 carbon atoms and halogen substitution products thereof and alkyl denotes an alkyl radical of from 1 to 5 carbon atoms.

3. The method of claim 1 wherein the essential carboxylate has the formula

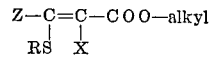

wherein Z is selected from the class consisting of hydrogen and hydrocarbon atoms which are free of aliphatic unsaturation and contain from 1 to 12 carbon atoms, X is halogen, R is selected from the class consisting of alkyl, aryl and alkaryl radicals of from 1 to 12 carbon atoms and halogen substitution products thereof and alkyl denotes an alkyl radical of from 1 to 5 carbon atoms.

4. The method of claim 1 wherein the essential carboxylate has the formula

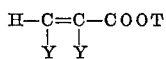

in which Y is selected from the class consisting of halogen, alkyl-S—, aryl-S—, and alkylaryl-S— radicals of from 1 to 12 carbon atoms and halogen substitution products of such radicals, and in which one Y, and only one Y, is halogen.

5. The method of claim 1 wherein the essential carboxylate is methyl 2-phenylthio-3-chloroacrylate.

6. The method of claim 1 wherein the essential carboxylate is methyl(4-chlorophenylthio) chloroacrylate.

7. The method of claim 1 wherein the essential carboxylate is methyl 2-(4-tolylthio) 3-chloroacrylate.

8. The method of claim 1 wherein the essential carboxylate is methyl 2-methylthio-3-chloroacrylate.

9. The method of claim 1 wherein the essential carboxylate is methyl (pentachlorophenylthio) chloroacrylate.

References Cited in the file of this patent
UNITED STATES PATENTS

| | | |
|---|---|---|
| 2,884,317 | Harris | Apr. 28, 1959 |
| 2,940,992 | Zaugg et al. | June 14, 1960 |
| 2,965,535 | Birum | Dec. 20, 1960 |

OTHER REFERENCES

Montanari et al.: Gazz. Chim. Ital., 87, 1062 to 1064 (1957).
Angeletti et al.: ibid., 1088, 1090, 1093, (1957).
Montanari et al.: ibid., 1104, 1107 to 1109, 1112 and 1114 (1957).
Gundermann et al.: Chem. Ber., 91, 1332 (1958).